I. N. YOUNG.
Gate.
No. 66,764.
Patented July 16, 1867.
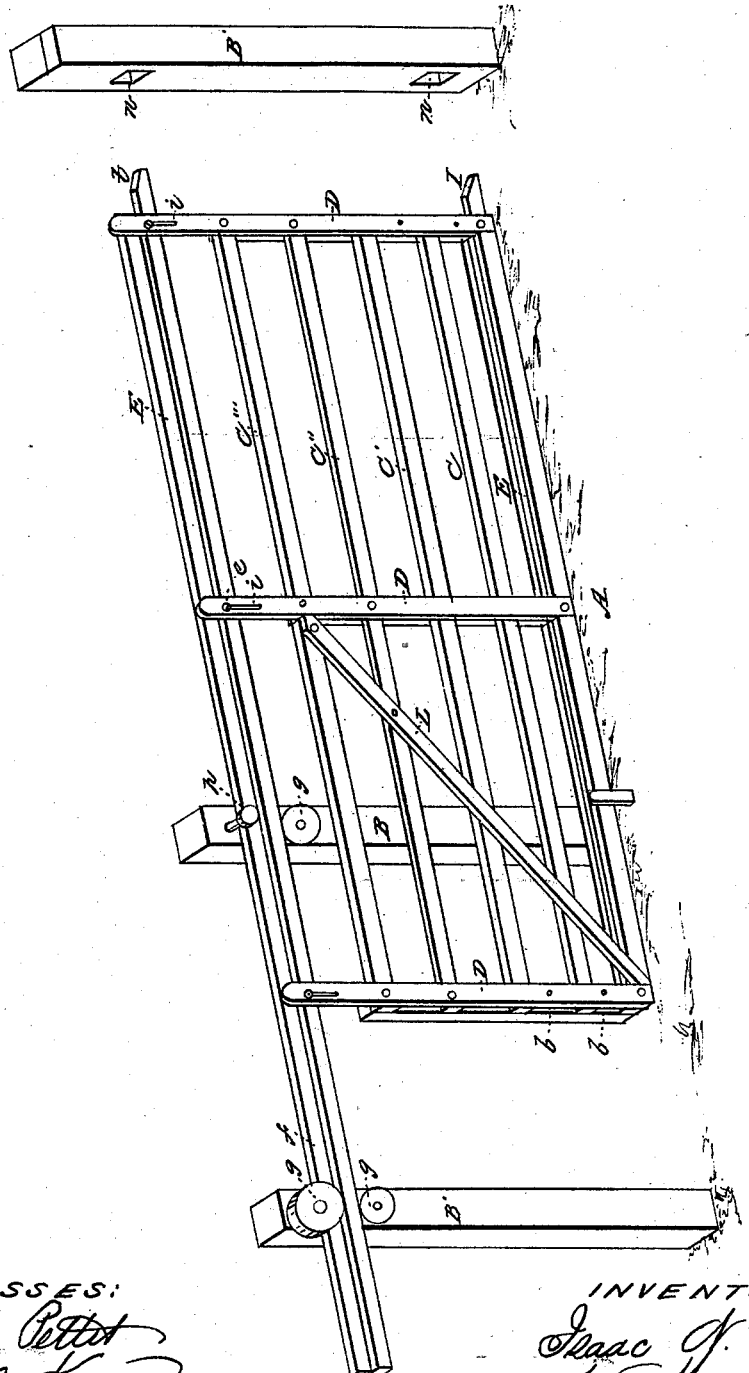
WITNESSES:
INVENTOR:

United States Patent Office.

ISAAC N. YOUNG, OF SWANN, INDIANA.

Letters Patent No. 66,764, dated July 16, 1867.

---

FARM-GATE.

---

The Schedule referred to in these Letters Patent and making part of the same.

---

TO ALL WHOM IT MAY CONCERN:

Be it known that I, ISAAC N. YOUNG, of Swann, in the county of Noble, and State of Indiana, have invented a new and useful Improvement in Farm-Gates; and I do hereby declare the following to be a full, clear, and exact description of the same, reference being had to the accompanying drawings, forming part of this specification, and in which—

Figure 1 represents a view of my improved gate from a point directly in front of the extremity of the balance-bar, showing the gate at an oblique angle in front and to the right.

The object of my invention is to obtain a gate for use on farms which shall be simple in construction and not liable to get out of repair, which shall be easily opened and shut, and capable of being adjusted higher or lower, as circumstances may require, which may be readily removed for repairs, and which shall be so adjustable as to permit the passing of the smaller animals about the farm, such as pigs, lambs, &c., while preventing the larger animals from escaping from one enclosure to another.

To accomplish this purpose I construct a gate as shown in the accompanying drawings, in which A represents the mud-sill supporting the posts B B, upon which the gate is hung, and the post B', against which the gate closes. $c$ $c'$ $c''$ $c'''$ are bars, of which the two lower ones, $c$ and $c'$, are capable of being slid backward and forward, resting upon the blocks $b$ $b$ $b$ $b$, which confine them in their proper position and yet permit their longitudinal motion. The two upper bars are fastened to the uprights D D D, and are immovable. The blocks $b$ $b$ are fastened firmly to the same uprights. The uprights D D D are attached to the balance-bar E by means of the bolts and nuts $e$ $e$, which, operating in the vertical slots $i$ $i$ $i$, permit the gate to be adjusted to a higher or lower position, as will sometimes be rendered necessary by the accumulation of snow or ice on the ground, or by the settling or racking of the gate or its supports. The balance-bar E is a beam supporting the gate, which depends from it, as before described, and travels on three rollers, $g$ $g$ $g$, that work on the posts B B. It has a vertical flange, $f$, which, running behind the sheave of the roller, keeps the balance-bar in its place. The rollers are assisted in this work by the pin $p$, in lieu of which a fourth roller might be used, but I prefer the pin from its greater cheapness and simplicity. The flange $f$ extends the whole length of the balance-beam. The uprights D D D have a shank between the slots $i$ $i$ $i$ and the top bar of the gate of sufficient length to permit the gate to run past the lower rollers. This arrangement, together with the flange running the entire length of the balance-bar, permits the gate to be removed from the fence by simply sliding it back sufficiently far to enable it to escape the rollers. The tenons $t$ $t$ on the end of the balance-bar and of the bottom of the gate, fitting into the mortises $m$ $m$ in the post B', hold the gate firmly when it is closed. L is a brace to strengthen the gate and prevent it from racking. It will be observed that in a gate thus constructed the balance-bar need not be of double the length of the gate, as is necessary in most sliding gates, but its length depends altogether upon the distance between the posts B B.

The gate is operated, as will at once be seen, by simply sliding it backward and forward. When closed its weight rests equally on the tenons $t$ $t$ and the rollers $g$ $g$. When slid forward and partially closed its weight rests on the roller in the middle post, and the balance-bar works against the upper roller on the other post B. When nearly open the weight is shifted and now rests on the lower roller of the latter post B, and bears slightly upward against the pin $p$. The pressure against the pin $p$ will be very slight, however, on account of the peculiar construction of my gate, which admits of the short balance-bar. If the balance-bar be made very long and heavy, of which there is no need, the upward pressure against the pin $p$, when the gate is open, or nearly open, will be proportionately increased.

Having thus described my invention, what I claim as new, and desire to secure by Letters Patent, is—

The gate above described, having the movable bars $c$ $c'$, the slotted uprights D D D, the bolt and nut $e$, the flanged balance-bar F, the three rollers $g$ $g$ $g$, and the pin $p$, all constructed and arranged substantially as and for the purpose specified.

To the above specification of my improvement I have signed my hand this 26th day of April, 1867.

I. N. YOUNG.

Witnesses:
 CHAS. A. PETTIT,
 S. C. KEMON.